United States Patent
Park et al.

(10) Patent No.: US 11,772,189 B2
(45) Date of Patent: Oct. 3, 2023

(54) GRAIN-ORIENTED ELECTRICAL STEEL SHEET AND MAGNETIC DOMAIN REFINING METHOD THEREFOR

(71) Applicant: POSCO, Pohang-si (KR)

(72) Inventors: Se-Min Park, Pohang-si (KR); Jae Soo Kim, Pohang-si (KR); Ki-Young Min, Pohang-si (KR); Seong-Cheol Hong, Pohang-si (KR); Won-Gul Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 401 days.

(21) Appl. No.: 16/957,932

(22) PCT Filed: Dec. 17, 2018

(86) PCT No.: PCT/KR2018/016037
§ 371 (c)(1),
(2) Date: Jun. 25, 2020

(87) PCT Pub. No.: WO2019/132360
PCT Pub. Date: Jul. 4, 2019

(65) Prior Publication Data
US 2021/0060694 A1    Mar. 4, 2021

(30) Foreign Application Priority Data
Dec. 26, 2017   (KR) .......................... 10-2017-0179924

(51) Int. Cl.
*B23K 26/00*   (2014.01)
*B23K 26/356*   (2014.01)
(Continued)

(52) U.S. Cl.
CPC ........ *B23K 26/0006* (2013.01); *B23K 26/356* (2015.10); *B23K 26/364* (2015.10); *B23K 2103/04* (2018.08)

(58) Field of Classification Search
CPC ....... B23K 26/00; B23K 26/0006; C21D 8/12
See application file for complete search history.

(56) References Cited

U.S. PATENT DOCUMENTS

| 4,963,199 A | 10/1990 | Pavlik et al. | |
| 2010/0279141 A1* | 11/2010 | Iwata | C21D 8/1294 219/121.72 |

FOREIGN PATENT DOCUMENTS

| CN | 101979676 A | 2/2011 |
| CN | 103367704 A | 10/2013 |

(Continued)

OTHER PUBLICATIONS

International Search Report and Written Opinion issued in International Application No. PCT/KR2018/016037 dated Mar. 26, 2019.
(Continued)

*Primary Examiner* — Nathaniel E Wiehe
*Assistant Examiner* — Spencer H. Kirkwood
(74) *Attorney, Agent, or Firm* — Morgan, Lewis & Bockius LLP

(57) ABSTRACT

A grain-oriented electrical steel sheet according to an embodiment of the present invention includes: a groove on a line formed on one surface of an electrical steel sheet in a direction crossing a rolling direction; and a thermal shock portion on a line formed on one surface of the electrical steel sheet in the direction crossing the rolling direction, wherein a distance between the groove and the thermal shock portion is 1 mm or less.

2 Claims, 4 Drawing Sheets

(51) Int. Cl.
*B23K 26/364* (2014.01)
*B23K 103/04* (2006.01)

(56) References Cited

FOREIGN PATENT DOCUMENTS

| | | | |
|---|---|---|---|
| CN | 104409716 A | 3/2015 | |
| CN | 104852026 A | 8/2015 | |
| CN | 105378985 A | 3/2016 | |
| CN | 105451902 A | 3/2016 | |
| CN | 105993090 A | 10/2016 | |
| CN | 106133959 A | 11/2016 | |
| CN | 107109512 A | 8/2017 | |
| EP | 2634148 A1 | 9/2013 | |
| EP | 3025797 A1 | 6/2016 | |
| JP | S572252 B2 | 1/1982 | |
| JP | S585968 B2 | 2/1983 | |
| JP | H05202450 A | 8/1993 | |
| JP | H05304016 A | 11/1993 | |
| JP | H0657857 B2 | 8/1994 | |
| JP | H0772300 B2 | 8/1995 | |
| JP | 3369724 B2 * | 1/2003 | |
| JP | 4319715 B2 * | 8/2009 | ......... B23K 26/0619 |
| JP | 5651522 B2 | 1/2015 | |
| JP | 2017125250 A | 7/2017 | |
| KR | 20090093487 A | 9/2009 | |
| KR | 20110063187 A | 6/2011 | |
| KR | 1020130128214 A * | 5/2012 | |
| KR | 20130128214 A | 11/2013 | |
| KR | 10-2014-0051970 A | 5/2014 | |
| KR | 20150012205 A | 2/2015 | |
| KR | 20160078247 A | 7/2016 | |
| KR | 101659350 B1 | 9/2016 | |
| KR | 20170074608 A | 6/2017 | |
| WO | 9724466 A1 | 7/1997 | |
| WO | 2011/016758 A1 | 2/2011 | |
| WO | WO-2016105055 A1 * | 6/2016 | ......... B23K 26/0622 |

OTHER PUBLICATIONS

Chinese Office Action dated Aug. 4, 2021 issued in Chinese Patent Application No. 201780075424.6.
Extended European Search Report dated Oct. 13, 2020 issued in European Patent Application No. 18894565.3.

* cited by examiner

GRAIN-ORIENTED ELECTRICAL STEEL SHEET AND MAGNETIC DOMAIN REFINING METHOD THEREFOR

CROSS-REFERENCE OF RELATED APPLICATIONS

This application is the U.S. National Phase under 35 U.S.C. § 371 of International Application No. PCT/KR2018/016037 filed on Dec. 17, 2018, which claims the benefit of Korean Patent Application No. 10-2017-0179924 filed Dec. 26, 2017. The entire disclosures of each are incorporated by reference herein.

TECHNICAL FIELD

The present invention relates to a grain-oriented electrical steel sheet and a magnetic domain refining method therefor. More specifically, the present invention relates to a grain-oriented electrical steel sheet and a magnetic domain refining method therefor that may refine a magnetic domain to a minimum size by combining a permanent magnetic domain refining method and a temporary magnetic domain refining method.

BACKGROUND ART

Since a grain-oriented electrical steel sheet is used as an iron core material of an electrical device such as a transformer, in order to ameliorate energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

As a method of lowering the iron loss of the grain-oriented electrical steel sheet, a magnetic domain refining method is known. In other words, it is a method of refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining methods include a permanent magnetic domain refining method, which retains an amelioration effect even after heat treatment, and a temporary magnetic domain refining method, which does not retain an amelioration effect after heat treatment.

The permanent magnetic domain refining method in which iron loss is ameliorated even after stress relaxation heat treatment at a heat treatment temperature or more at which recovery occurs may be classified into an etching method, a roll method, and a laser method. According to the etching method, since a groove is formed on a surface of a steel sheet through selective electrochemical reaction in a solution, it is difficult to control a shape of the groove, and it is difficult to uniformly secure iron loss characteristics of a final product in a width direction thereof. In addition, the etching method has a disadvantage that it is not environmentally friendly due to an acid solution used as a solvent.

The permanent magnetic domain refining method using a roll is a magnetic domain refining technology that provides an effect of ameliorating iron loss that partially causes recrystallization at a bottom of a groove by forming the groove with a certain width and depth on a surface of a plate by pressing the roll or plate by a protrusion formed on the roll and then annealing it. The roll method is disadvantageous in stability in machine processing, in reliability due to difficulty in securing stable iron loss depending on a thickness, in process complexity, and in deterioration of the iron loss and magnetic flux density characteristics immediately after the groove formation (before the stress relaxation annealing).

The permanent magnetic domain refining method using a laser is a method in which a laser beam of high output is irradiated onto a surface portion of an electrical steel sheet moving at a high speed, and a groove accompanied by melting of a base portion is formed by the laser irradiation. However, these permanent magnetic domain refining methods also have difficulty in refining the magnetic domain to a minimum size.

Current technology of the temporary domain refining method does not focus on performing coating once again after irritating the laser in a coated state, and thus, the laser is not attempted to be irradiated with a predetermined intensity or higher. This is because when the laser is irradiated with a predetermined intensity or higher, it is difficult to properly obtain a tension effect due to damage to the coating.

Since the permanent magnetic domain refining method is to increase a free charge area that may receive static magnetic energy by forming a groove, a deep groove depth is required as much as possible. In addition, a side effect such as a decrease in magnetic flux density also occurs due to the deep groove depth. Therefore, in order to reduce the magnetic flux density deterioration, the groove is managed with an appropriate depth.

DISCLOSURE

A grain-oriented electrical steel sheet and a magnetic domain refining method therefor are provided. Specifically, it is an object of the present invention to provide to a grain-oriented electrical steel sheet and a magnetic domain refining method therefor that may refine a magnetic domain to a minimum size by combining a permanent magnetic domain refining method and a temporary magnetic domain refining method.

An embodiment of the present invention provides a grain-oriented electrical steel sheet including: a groove on a line formed on one surface of an electrical steel sheet in a direction crossing a rolling direction; and a thermal shock portion on a line formed on one surface of the electrical steel sheet in the direction crossing the rolling direction, wherein a distance between the groove and the thermal shock portion is 1 mm or less.

Another embodiment of the present invention provides a grain-oriented electrical steel sheet, including: a groove on a line formed on one surface of an electrical steel sheet in a direction crossing a rolling direction; and a thermal shock portion on a line formed on the other surface of the electrical steel sheet in the direction crossing the rolling direction, wherein a distance between an imaginary line in which the groove is symmetrically projected onto the other surface with respect to a center of thickness of the steel sheet and the thermal shock portion is 1 mm or less.

A depth of the groove may be 1 to 10% of a thickness of the steel sheet.

A plurality of grooves may be formed, and a distance between the grooves may be 1.5 to 10 mm.

A plurality of thermal shock portions may be formed, and a distance between the thermal shock portions may be 1 to 5 times the distance between the grooves.

Another embodiment of the present invention provides a magnetic domain refining method of a grain-oriented electrical steel sheet, including: preparing a grain-oriented electrical steel sheet; forming a groove by irradiating a laser on one surface of the grain-oriented electrical steel sheet in a direction crossing a rolling direction; and forming a thermal shock portion by irradiating a laser on one surface of the grain-oriented electrical steel sheet in the direction crossing the rolling direction, wherein a distance between the groove and the thermal shock portion is 1 mm or less.

Another embodiment of the present invention provides a magnetic domain refining method of a grain-oriented electrical steel sheet, including: preparing a grain-oriented electrical steel sheet; forming a groove by irradiating a laser on one surface of the grain-oriented electrical steel sheet in a direction crossing a rolling direction; and forming a thermal shock portion by irradiating a laser on the other surface of the grain-oriented electrical steel sheet in the direction crossing the rolling direction, wherein a distance between an imaginary line in which the groove is symmetrically projected onto the other surface with respect to a center of thickness of the steel sheet and the thermal shock portion is 1 mm or less.

In the forming of the groove, energy density of the laser may be 0.5 to 2 $J/mm^2$, and in the forming of the thermal shock portion, energy density of the laser may be 0.05 to 0.2 $J/mm^2$.

In the forming of the groove, a beam length of the laser may be 300 to 5000 μm in a rolling vertical direction of the steel sheet, and a beam width of the laser may be 10 to 200 μm in a rolling direction of the steel sheet.

In the forming of the thermal shock portion, a beam length of the laser may be 1500 to 10,000 μm in a rolling vertical direction of the steel sheet, and a beam width of the laser may be 100 to 1000 μm in a rolling direction of the steel sheet.

The magnetic domain refining method of the grain-oriented electrical steel sheet may further include forming an insulating coating layer on a surface of the steel sheet.

The magnetic domain refining method of the grain-oriented electrical steel sheet may further include, after the forming of the groove, forming an insulating coating layer on a surface of the steel sheet.

According to the embodiment of the present invention, it is possible to refine a magnetic domain to a minimum size by combining a permanent magnetic domain refining method and a temporary magnetic domain refining method.

In addition, by combining a permanent magnetic domain refining method and a temporary magnetic domain refining method, it is possible to ameliorate iron loss.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses the expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter, in which exemplary embodiments of the invention are shown. As those skilled in the art would realize, the described embodiments may be modified in various different ways, all without departing from the spirit or scope of the present invention.

Figure 1:
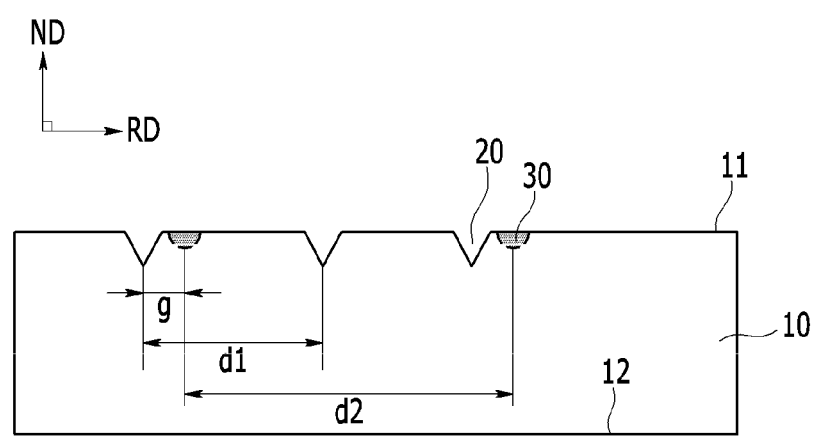
FIG. 1 illustrates a schematic view of a cross-section (TD surface) of a grain-oriented electrical steel sheet according to an embodiment of the present invention.
Figure 2:
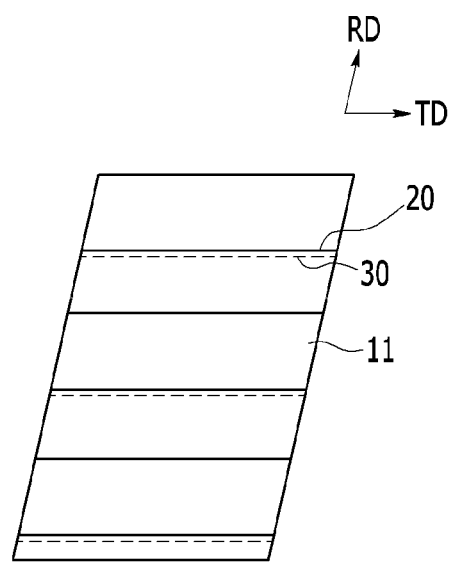
FIG. 2 illustrates a schematic view of a rolled surface (ND surface) of a grain-oriented electrical steel sheet according to an embodiment of the present invention.

FIG. 1 and FIG. 2 show a schematic view of a grain-oriented electrical steel sheet 10 in which magnetic domains are refined by an embodiment of the present invention.

As shown in FIG. 1 and FIG. 2, the grain-oriented electrical steel sheet 10 according to the embodiment of the present invention includes: a groove 20 on a line formed on one surface 11 of the electrical steel sheet in a direction crossing a rolling direction (RD direction); and a thermal shock portion 30 on a line formed on one surface 11 of the electrical steel sheet in the direction crossing the rolling direction, and a distance g between the groove 20 and the thermal shock portion 30 is 1 mm or less.

According to the embodiment of the present invention, the groove 20 and the thermal shock portion 30 are simultaneously formed, so that the magnetic domain may be refined to a minimum size, and as a result, iron loss may be ameliorated. When forming the groove 20 with a laser, energy is strong enough to generate iron powder, thus a temperature in the vicinity thereof increases very high. When the laser for forming the thermal shock portion 30 is irradiated in the vicinity, a peripheral portion of the groove 20 receives heat, and heat shrinkage occurs during cooling. Tensile stress acts on the steel sheet 10 due to the heat shrinkage. As a result, the tensile stress reduces a size of a magnetic domain. In addition, a free surface formed by the formation of the groove 20 generates a static magnetic energy surface charge to form a closed curve, two effects by different mechanisms are simultaneously formed, and the iron loss is further reduced due to synergy of the two effects.

In FIG. 1, the distance between the groove 20 and the thermal shock portion 30 is denoted by g. The distance g between the groove 20 and the thermal shock portion 30 may be 1 mm or less. When the distance g is increased, it may be a factor that hinders the reduction of iron loss by forming a bad magnetic domain rather than an effect of additional reduction of an intended iron loss. More specifically, the distance g between the groove 20 and the thermal shock portion 30 may be 1 μm to 0.5 mm. Even more specifically, the distance g between the groove 20 and the thermal shock portion 30 may be 0.1 mm to 0.45 mm.

As shown in FIG. 1, when a plurality of grooves 20 and a plurality of thermal shock portions 30 are formed, a distance g is provided between an arbitrary groove 20 and a heat shock portion 30 closest to the groove 20. In addition, when a plurality of grooves 20 and a plurality of thermal shock portions 30 are formed, an average value between each distance g may satisfy the above-described range. Further, in the embodiment of the present invention, since a thickness exists in the groove 20 and the heat shock portion 30 in the rolling direction (RD direction), it means a distance g between a center line of the groove 20 and a center line of the heat shock portion 30.

As shown in FIG. 1, the groove 20 means a portion of a surface of the steel sheet removed by laser irradiation. In FIG. 1, a shape of the groove 20 is illustrated as a wedge shape, but this is merely an example, and the groove may be formed in various shapes such as a square shape, a trapezoidal shape, a U-shape, a semi-circular shape, and a W-shape.

A depth of the groove 20 may be 1 to 10% of the thickness of the steel sheet. When the depth of the groove 20 is too shallow, it is difficult to obtain a suitable iron loss ameliorating effect. When the depth of the groove is too deep, due to strong laser irradiation, texture characteristics of the steel sheet 10 are greatly changed, or a large amount of heel-up and spatter are formed, thus magnetic properties may be deteriorated. Therefore, it is preferable to control the depth of the groove 20 in the above-described range.

As shown in FIG. 1, a plurality of grooves 20 are formed along the rolling direction (RD direction), and a distance d1 between the grooves 20 may be 1.5 to 10 mm. When the distance between the grooves 20 is too narrow or too wide, an appropriate effect of ameliorating iron loss may not be obtained. More specifically, the distance d1 between the grooves 20 may be 2 to 5 mm. In FIG. 1, the distance between grooves 20 is indicated by d1. More specifically, the distance d1 between the grooves 20 means a distance between center lines of the grooves 20.

Unlike the groove 20, the thermal shock portion 30 is apparently indistinguishable from other surfaces of the steel sheet. The thermal shock portion 30 is a portion that is etched in a form of a groove when immersed in hydrochloric acid of a concentration of 5% or more for 10 minutes or more, and may be distinguished from other surface portions of the steel sheet.

As shown in FIG. 1, a plurality of thermal shock portions 30 may be formed along the rolling direction (RD direction). In this case, a distance d2 between the thermal shock portions 30 may be 1 to 5 times (integer multiple) the distance d1 between the grooves 20. For example, when the distance d2 between the heat shock portions 30 is 1 times the distance d1 between the grooves 20, one heat shock portion 30 is formed for each groove 20. When the distance d2 between the heat shock portions 30 is 2 times the distance d1 between the grooves 20, two heat shock portions 30 are formed for each groove 20. FIG. 1 and FIG. 2 show a case in which the distance d2 between the heat shock portions 30 is 2 times the distance d1 between the grooves 20, and FIG. 3 shows a case in which the distance d2 between the heat shock portions 30 is 1 times the distance d1 between the grooves 20.

Figure 3:
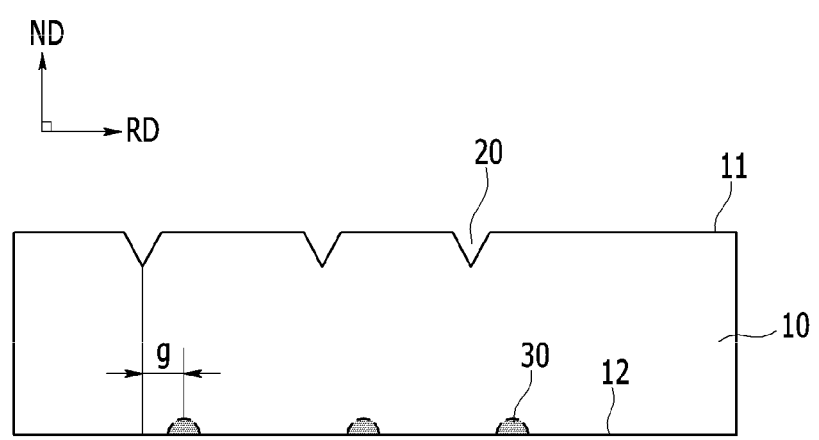
FIG. 3 illustrates a schematic view of a cross-section (TD surface) of a grain-oriented electrical steel sheet according to another embodiment of the present invention.

FIG. 3 illustrates a schematic view of a grain-oriented electrical steel sheet 10 according to another embodiment of the present invention.

As shown in FIG. 3, the grain-oriented electrical steel sheet 10 according to another embodiment of the present invention includes: a groove 20 on a line formed on one surface 11 of the electrical steel sheet in a direction crossing a rolling direction; and a thermal shock portion 30 on a line formed on the other surface 12 of the electrical steel sheet in the direction crossing the rolling direction, and a distance g between an imaginary line in which the groove 20 is symmetrically projected onto the other surface with respect to a center of thickness of the steel sheet and the thermal shock portion 30 is 1 mm or less.

Another embodiment of the present invention is the same as in FIG. 1 except that the groove 20 is formed on one surface 11 and the thermal shock portion 30 is formed on the other surface 12. In addition, the distance g between the groove 20 and the thermal shock portion 30, that is, based on an imaginary line in which the groove 20 is symmetrically projected onto the other surface with respect to a center of thickness of the steel sheet, the distance g between the imaginary line and the thermal shock portion 30 is controlled. Since constituent elements of the another embodiment are the same as those described in the embodiment of the present invention, except that the thermal shock portion 30 is formed on the other surface 12, a duplicate description thereof will be omitted.

In addition, in the embodiment of the present invention, the groove 20 may be formed on both surfaces, or the thermal shock part 30 may be formed on both surfaces, but the present invention is not limited thereto.

A magnetic domain refining method of a grain-oriented electrical steel sheet according to an embodiment of the present invention includes preparing a grain-oriented electrical steel sheet 10; forming a groove 20 by irradiating a laser on one surface 11 of the grain-oriented electrical steel sheet in a direction crossing a rolling direction; and forming a thermal shock portion 30 by irradiating a laser on one surface 11 of the grain-oriented electrical steel sheet in the direction crossing the rolling direction.

First, the grain-oriented electrical steel sheet 10 is prepared. The magnetic domain refining method according to the embodiment of the present invention has features in shapes of the groove 20 and the thermal shock portion 30, thus the grain-oriented electrical steel sheet for the magnetic domain refining may be used without limitation. Particularly, an effect of the present invention is realized regardless of an alloy composition of the grain-oriented electrical steel sheet. Therefore, a detailed description of the alloy composition of the grain-oriented electrical steel sheet will be omitted.

In the embodiment of the present invention, as the grain-oriented electrical steel sheet, a grain-oriented electrical steel sheet rolled to a predetermined thickness through hot rolling and cold rolling from a slab, may be used.

Next, one surface 11 of the grain-oriented electrical steel sheet is irradiated with a laser in a direction crossing the rolling direction (RD direction) to form the groove 20.

In this case, energy density (Ed) of the laser may be 0.5 to 2 J/mm$^2$. When the energy density is too small, the groove 20 having an appropriate depth is not formed, and thus it is difficult to obtain an effect of ameliorating iron loss. In contrast, when the energy density is too large, the groove 20 having a too large depth is formed, and thus it is difficult to obtain an effect of ameliorating iron loss.

Figure 4:
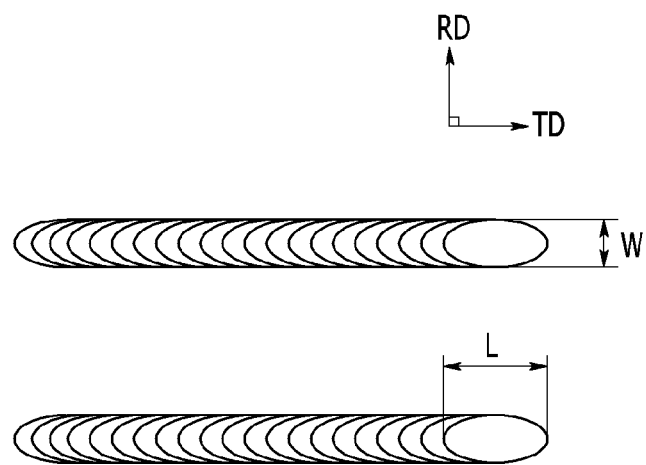
FIG. 4 illustrates a schematic view of a shape of a laser beam according to an embodiment of the present invention.

FIG. 4 shows a schematic diagram of a shape of a laser beam. In the forming of the groove, a beam length L of the laser in a rolling vertical direction (TD direction) of the steel sheet may be 300 to 5000 μm. When the beam length L in the rolling vertical direction (TD direction) is too short, a time for which the laser is irradiated is too short, so that an appropriate groove may not be formed, and it is difficult to obtain an effect of ameliorating iron loss. In contrast, when the beam length L in the rolling vertical direction (TD direction) is too long, a time for which the laser is irradiated is too long, so that the groove 20 having too large a depth is formed, and it is difficult to obtain an effect of ameliorating iron loss.

A beam width W of the laser in the rolling direction (RD direction) of the steel sheet may be 10 to 200 μm. When the beam width W is too short or long, a width of the groove 20 may be short or long, and thus an appropriate magnetic domain refining effect may not be obtained.

In addition, 2 to 6 grooves 20 and thermal shock portions 30 may be intermittently formed with respect to the rolling vertical direction (TD direction) of the steel sheet, and may form an angle of 82° to 98° with respect to the rolling direction (RD direction), and the laser beam may be irradiated along such a shape.

A type of the laser beam is not particularly limited, and a single fiber laser may be used.

Next, one surface 11 of the grain-oriented electrical steel sheet is irradiated with a laser in a direction crossing the rolling direction (RD direction) to form the thermal shock portion 30.

In this case, energy density (Ed) of the laser may be 0.05 to 0.2 J/mm$^2$. When the energy density is too small, an appropriate thermal shock portion 30 is not formed, and thus it is difficult to obtain an effect of ameliorating iron loss. In contrast, when the energy density is too large, a surface of the steel sheet is damaged, and thus it is difficult to obtain an effect of ameliorating iron loss.

In the forming of the thermal shock portion, the beam length L of the laser in the rolling vertical direction (TD direction) of the steel sheet may be 1500 to 10,000 μm, and the beam width W of the laser in the rolling direction (RD direction) of the steel sheet may be 100 to 1000 μm.

The forming of the groove 20 and the forming of the thermal shock portion 30 described above may be performed without limitation before and after the time. Specifically, after the forming of the groove 20, the thermal shock portion 30 may be formed. In addition, after the forming of the thermal shock portion 30, the groove 20 may be formed.

The magnetic domain refining method of the grain-oriented electrical steel sheet according to the embodiment of the present invention may further include forming an insulating coating layer. The forming of the insulating coating layer may be included after the preparing of the grain-oriented electrical steel sheet, after the forming of the groove, or after the forming of the thermal shock portion. More specifically, it may be included after the forming of the groove. When the insulating coating layer is formed after the forming of the groove, there is an advantage in that the insulating coating may be performed only once.

A method of forming the insulating coating layer may be used without particular limitation, and for example, the insulating coating layer may be formed by applying an insulating coating solution containing a phosphate. It is preferable to use a coating solution containing colloidal silica and a metal phosphate as the insulating coating solution. In this case, the metal phosphate may be Al phosphate, Mg phosphate, or a combination thereof, and a content of Al, Mg, or a combination may be 15 wt % or more with respect to a weight of the insulating coating solution.

A magnetic domain refining method of a grain-oriented electrical steel sheet according to another embodiment of the present invention includes: preparing a grain-oriented electrical steel sheet 10; forming a groove 20 by irradiating a laser on one surface 11 of the grain-oriented electrical steel sheet in a direction crossing a rolling direction; and forming a thermal shock portion 30 by irradiating a laser on the other surface 12 of the grain-oriented electrical steel sheet in the direction crossing the rolling direction, and a distance between an imaginary line in which the groove 20 is symmetrically projected onto the other surface with respect to a center of thickness of the steel sheet and the thermal shock portion 30 is 1 mm or less.

The magnetic domain refining method of the grain-oriented electrical steel sheet according to another embodiment of the present invention is the same as the above-described method except that the irradiation of the laser for the formation of the thermal shock portion 30 is performed on the other surface 12 of the steel sheet, so a duplicate description thereof will be omitted.

Hereinafter, the present invention will be described in more detail through examples. However, the examples are only for illustrating the present invention, and the present invention is not limited thereto.

Experimental Example 1: Interval Between Groove and Thermal Shock Line

A grain-oriented electrical steel sheet having a cold rolled thickness of 0.20 mm was prepared. A groove was formed by irradiating a laser beam of a fiber continuous laser on one surface of the electrical steel sheet with a copper mirror. A width W of the laser beam was 50 μm, and a length L of the laser beam was 5000 μm. Energy density of the laser was 1.5 J/mm², and a depth of the groove was 10 μm.

The grooves were formed at distances d1 between the grooves shown in Table 1 below, and an insulating film was formed.

Then, a thermal shock line was formed by irradiating a laser beam of a fiber continuous laser on one surface or the other surface of the electrical steel sheet with a copper mirror. A width W of the laser beam was 500 μm, and a length L of the laser beam was 10,000 μm. Energy density of the laser was 0.1 J/mm².

The thermal shock lines were formed at distances d2 between the thermal shock lines shown in Table 1 below, and average distances g between the grooves and the thermal shock lines are shown in Table 1.

Table 1 below shows amelioration rates of iron loss. The iron loss amelioration rate was calculated as $(W_1-W_2)/W_1$ by measuring iron loss $W_1$ of the electrical steel sheet before the groove was formed by irradiating the laser and iron loss $W_2$ of the electrical steel sheet after the groove was formed by irradiating the laser. The iron loss was measured by the iron loss value (W17/50) at a frequency of 50 Hz when a magnetic flux density was 1.7 Tesla.

TABLE 1

|  | Distance between grooves (d1, mm) | Distance between thermal shock lines (d2, mm) | Thermal shock line formation surface | Distance between groove and thermal shock line (g, mm) | Iron loss amelioration rate (%) |
| --- | --- | --- | --- | --- | --- |
| Example 1 | 4 | 4 | One surface | 0.55 | 12 |
| Example 2 | 3 | 3 | One surface | 0.63 | 10 |
| Example 3 | 2.5 | 2.5 | One surface | 0.86 | 9 |
| Example 4 | 2 | 4 | One surface | 0.39 | 15 |
| Example 5 | 2.5 | 5 | One surface | 0.23 | 16 |
| Example 6 | 2 | 4 | Other surface | 0.43 | 15 |
| Example 7 | 2.5 | 5 | Other surface | 0.16 | 16 |
| Comparative Example 1 | 4 | None | None | None | 8 |
| Comparative Example 2 | 4 | 4 | One surface | 1.03 | 4 |

As shown in Table 1, it can be confirmed that Comparative Example 1, in which the thermal shock line was not formed, and Comparative Example 2, in which the thermal shock line was formed at more than 1 mm apart from the groove, had poor iron loss amelioration rate compared to the examples.

Even among the examples, it can be confirmed that the smaller the average distance g between the groove and the thermal shock line was, the better the iron loss amelioration rate was, and it can be confirmed that even if a thermal shock line was formed per two grooves or a thermal shock line was formed on an opposite side of the groove, there was no significant effect on the iron loss amelioration rate.

Experimental Example 2: Groove Depth

A grain-oriented electrical steel sheet having a cold rolled thickness of 0.20 mm was prepared. A groove was formed by irradiating a laser of a fiber continuous laser on one surface of the electrical steel sheet with a copper mirror. A width W of the laser beam was 50 μm, and a length L of the laser beam was 5000 μm. Energy density of the laser and a depth of the groove were respectively changed to values shown in Table 2 below.

The grooves were formed at distances d1 between the grooves shown in Table 2 below, and an insulating film was formed.

The thermal shock line was formed on one surface of the steel sheet at the distance d2 between the thermal shock lines, wherein the distance d2 is the same as the distance d1 between the grooves, and the average distance (g) between the grooves and the thermal shock lines was adjusted in 0.7 to 0.8 mm.

TABLE 2

|  | Distance between grooves (d1, mm) | Groove depth (μm) | Iron loss amelioration rate (%) |
| --- | --- | --- | --- |
| Example 3 | 2.5 | 10 | 9 |
| Example 8 | 2.7 | 11 | 9 |
| Example 9 | 3 | 13 | 10 |
| Example 10 | 4 | 14 | 12 |
| Example 11 | 5 | 15 | 14 |

As shown in Table 2, it can be confirmed that even if the distance between the grooves increased, the iron loss amelioration rate increased as the depth of the groove increased.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described exemplary embodiments are for illustrative purposes only, and the scope of the present invention is not limited thereto.

<Description of symbols>

10: grain-oriented electrical steel sheet
11: one surface of steel sheet,
12: other surface of steel sheet
20: groove
30: thermal shock portion

The invention claimed is:

1. A grain-oriented electrical steel sheet, comprising:
a groove on a line formed on one surface of an electrical steel sheet in a direction crossing a rolling direction; and
a thermal shock portion on a line formed on one surface of the electrical steel sheet in the direction crossing the rolling direction, wherein a distance between the groove and the thermal shock portion is 1 mm or less, and wherein a plurality of the thermal shock portions are formed, and a distance between the thermal shock portions is 2 to 5 times the distance between the grooves.

2. The grain-oriented electrical steel sheet of claim 1, wherein a plurality of grooves are formed, and a distance between the grooves is 1.5 to 10 mm.

\* \* \* \* \*